(No Model.) 2 Sheets—Sheet 1.

S. P. GRAHAM.
LAWN MOWER.

No. 519,860. Patented May 15, 1894.

Witnesses
A. L. Hobbie
M. B. O'Dogherty

Inventor
Simon P. Graham
By Thos. S. Sprague & Son
Attys.

(No Model.) 2 Sheets—Sheet 2.
S. P. GRAHAM.
LAWN MOWER.
No. 519,860. Patented May 15, 1894.
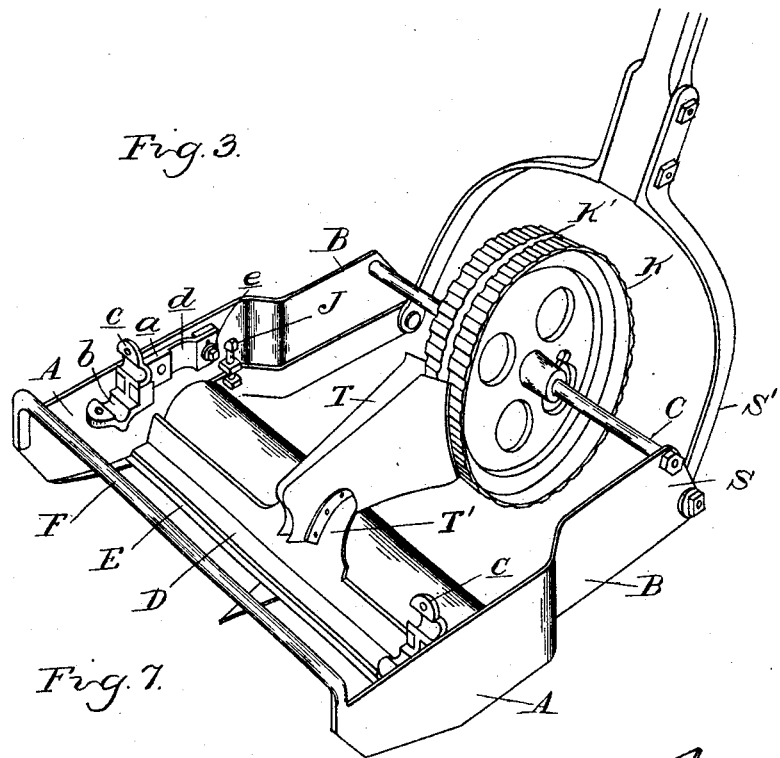
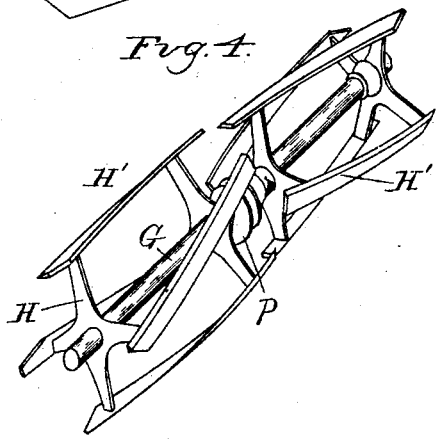
Witnesses
D. L. Nobbie
Th. B. O'Dogherty
Inventor
Simon P. Graham
By Thos. Sprague & Son
Attys.

UNITED STATES PATENT OFFICE.

SIMON P. GRAHAM, OF DETROIT, MICHIGAN.

LAWN-MOWER.

SPECIFICATION forming part of Letters Patent No. 519,860, dated May 15, 1894.

Application filed March 16, 1893. Serial No. 466,195. (No model.)

*To all whom it may concern:*

Be it known that I, SIMON P. GRAHAM, a citizen of the United States, residing at Detroit, in the county of Wayne and State of Michigan, have invented certain new and useful Improvements in Lawn-Mowers, of which the following is a specification, reference being had therein to the accompanying drawings.

The invention consists in the peculiar construction of a cutter, the driving mechanism for the cutter, the frame, and the peculiar construction, combination and arrangement of the different parts as more fully hereinafter described.

Figure 2:
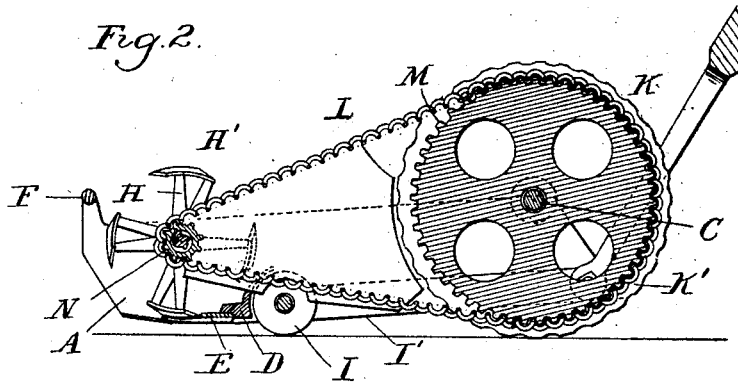
Figure 1:
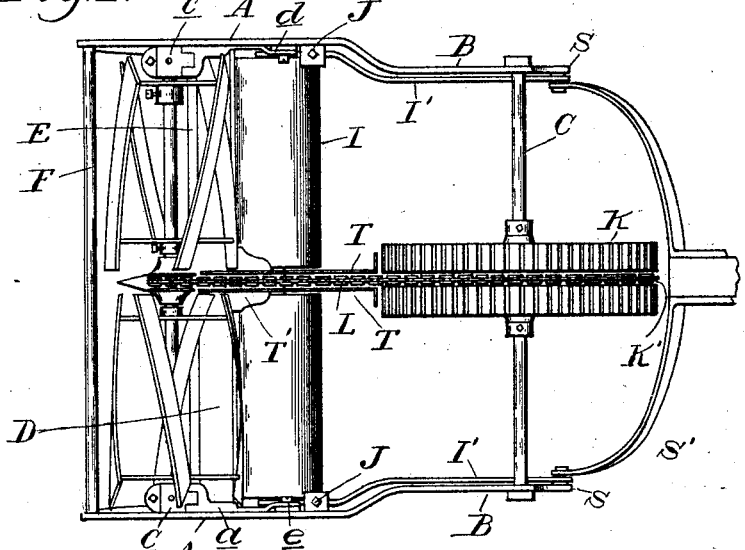
Figures 5, 6:
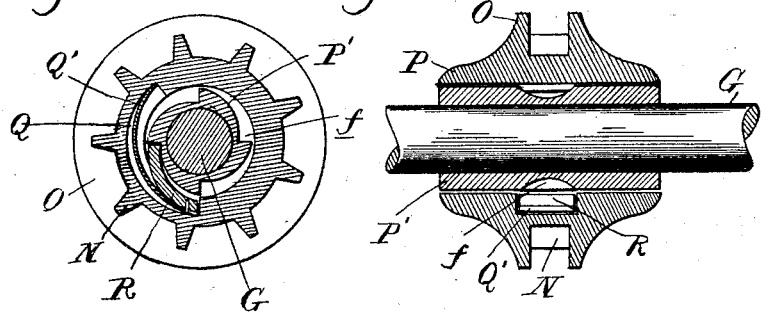

In the drawings, Figure 1 is a top plan view of my improved mower. Fig. 2 is a vertical central, longitudinal section therethrough. Fig. 3 is a perspective view of the lawn mower frame with the cutter removed. Fig. 4 is a perspective view of the cutter. Fig. 5 is a cross section through the cutter shaft illustrating the construction of the ratchet and pawl connection between the shaft and the driving sprocket pinion. Fig. 6 is a vertical, central, longitudinal section through the driving pinion and the parts shown in Fig. 5. Fig. 7 is a cross section through one of the cutter blades.

The frame of my machine consists of two thin metal side bars A, having the contracted rear portion B and connected together by the rear cross-bar C and the front cross-bar D, which front bar forms a support for the stationary knife E. F is a guard rail which also serves to stiffen the forward end of the frame. Near the front of the frame and on the insides of the two side bars are secured the two plates $a$ having the half boxes $b$ formed thereon.

$c$ are complementary half boxes hinged to the plates $a$, the whole adapted to form a support for the cutter shaft G.

The cutter proper consists of two cutters separated centrally; each of these consisting of spiders H secured upon the shaft, at the ends of the arms of which are secured the twisted spirally arranged blades H'. The blades of the two cutter heads are arranged so that they are at work alternately and they are also arranged so that the point of the blade nearest the center will strike the stationary knife first and gradually cut away that point to the outer end. The object of this arrangement is two-fold: first it arranges the blades so that a single point is cutting at a time, thereby distributing the power and reducing the work required to a minimum, and second, it throws the grass to both sides, so that the operator in cutting wet grass has none of the grass thrown upon him. At the same time with this construction, where the driving mechanism is applied centrally it throws it away from such driving mechanism and prevents its clogging.

The plates $a$ have a rear extension $d$ provided with a vertical slot, through which a clamping bolt $e$ passes. By loosening the nut of this bolt, the arm $d$ may be adjusted vertically and with it the cutter, then tightening the nut of the clamping bolt, it will be held in its adjusted position. This gives me the necessary adjustment of the cutter head to and from the stationary knife. To adjust the stationary knife to and from the ground I journal ground wheels I at the forward end of the arms I' which are pivoted at the rear to the frame and bear against adjusting screws J to limit their upward movement, as plainly shown in Fig. 3.

The driving mechanism for the cutter is applied centrally between the two cutter heads and gets its power from the ground wheel K journaled on the shaft C, between suitable collars. This wheel is provided with a central groove K' of a depth greater than the thickness of the sprocket chain L and at the bottom of this groove are arranged teeth M, with which the sprocket chain engages. This chain extends forwardly between the cutter heads and engages over a sprocket pinion N on the cutter shaft. This sprocket pinion is formed between two flanges O of a sleeve P and turns upon a sleeve P', which is fastened to the shaft G in any desired manner. It may be done by shrinking on or in any other way. In this sleeve P' is formed suitable notches $f$ forming a ratchet wheel.

In the interior of the sleeve P I form a segmental circular recess Q in which fits a spring Q', preferably extending from one end to or near the other. Upon one end of this spring is secured the spring pawl R which abuts at its end against one end of the recess Q and at the other end springs inwardly engaging with the ratchet wheel on the sleeve P', all so arranged that in backing the machine the pawl will turn over the ratchet wheel without positively engaging therewith, but in the reverse direction the pawl will engage with the teeth and turn the cutter shaft. By arranging the pawl so that one end bears against the end of the recess Q, the strain is imparted directly to the sleeve P from the ratchet and I find that there is little or no difficulty from breakage with a pawl of this construction, at the same time it enables me to use the ordinary cold roll shaft which can be bought on the market, simply fastened on the sleeve P', with notches therein to make a strong and effective device, while heretofore it has been found necessary in making such a ratchet to form a segmental enlargement of the shaft itself by turning down the ends. To drive the wheel, I form extensions S, upon each of the side-bars of the frame, and at the lower end of that extension I connect the handle S', the parts being so arranged that I press downward upon the short lever formed by the rear extensions of the side-bars and thus get a better traction on the ground wheel K.

T are guard plates arranged on each side of the drive chain, secured to lips T' on the cross-bar D. This may be used if desired to prevent grass from clogging in the drive chain.

What I claim as my invention is—

1. In a lawn mower, the combination of the cutter shaft, the cutters thereon, a sleeve upon the shaft having a ratchet formed centrally thereon, a sprocket pinion journaled upon the sleeve, an interior recess in the pinion, a spring in said recess, a pawl secured to said spring and having one end abutting against the end of the recess in the pinion and its free end engaging the ratchet wheel, substantially as described.

2. In a lawn mower, the combination with a frame, of centrally divided cutters, a grooved wheel, a sprocket chain passing over the wheel and between the cutters, a rigid cross-bar at the lower forward end of the frame, upwardly extending lips centrally on the cross-bar, and guard plates on opposite sides of the chain, having their forward ends secured to the lips, substantially as described.

3. In a lawn mower, the combination with a stationary cutter, of a rotary cutter divided centrally into two sections, the blades of each section being out of contact with those of the other section and arranged on a spiral opposite to the spiral of the blades of the opposite section, the blades on one section alternating with those of the opposite section and means extending between the sections for rotating the same, substantially as described.

In testimony whereof I affix my signature in presence of two witnesses.

SIMON P. GRAHAM.

Witnesses:
   M. B. O'DOGHERTY,
   P. M. HULBERT.